United States Patent
Li

(10) Patent No.: US 11,620,963 B2
(45) Date of Patent: Apr. 4, 2023

(54) ELECTRONIC DISPLAY SYSTEM AND SCREEN BRIGHTNESS ADJUSTING METHOD THEREOF

(71) Applicants: Maintek Computer (Suzhou) Co., Ltd., JiangSu (CN); PEGATRON CORPORATION, Taipei (TW)

(72) Inventor: Xiao-Wei Li, JiangSu (CN)

(73) Assignees: MAINTEK COMPUTER (SUZHOU) CO., LTD., Jiangsu (CN); PEGATRON CORPORATION, Taipei (TW)

( * ) Notice: Subject to any disclaimer, the term of this patent is extended or adjusted under 35 U.S.C. 154(b) by 111 days.

(21) Appl. No.: 16/894,188

(22) Filed: Jun. 5, 2020

(65) Prior Publication Data
US 2020/0388239 A1 Dec. 10, 2020

(30) Foreign Application Priority Data
Jun. 6, 2019 (CN) .......................... 201910491397.1

(51) Int. Cl.
G09G 5/00 (2006.01)
G06F 13/42 (2006.01)

(52) U.S. Cl.
CPC ......... *G09G 5/003* (2013.01); *G06F 13/4282* (2013.01); *G06F 2213/0042* (2013.01); *G09G 2320/0626* (2013.01); *G09G 2370/04* (2013.01)

(58) Field of Classification Search
CPC .................. G09G 5/003; G09G 5/373; G09G 2320/0626; G09G 2320/08; G09G 2310/08; G09G 2340/0407; G09G 2370/04; G06F 13/4282; G06F 2213/0042

USPC .................................................. 345/211, 690
See application file for complete search history.

(56) References Cited

U.S. PATENT DOCUMENTS

| 9,148,001 B1* | 9/2015 | Mohanty | H02G 3/00 |
| 9,465,393 B2 | 10/2016 | Chou et al. | |
| 2017/0017283 A1* | 1/2017 | Seo | G06F 1/266 |
| 2017/0295028 A1* | 10/2017 | Pelissier | H04L 12/10 |
| 2018/0204506 A1* | 7/2018 | Chen | G06F 13/4282 |

FOREIGN PATENT DOCUMENTS

| CN | 104917016 A | 9/2015 |
| CN | 103777730 B | 5/2016 |
| JP | 2000075803 A | 3/2000 |

* cited by examiner

*Primary Examiner* — Jennifer T Nguyen
(74) *Attorney, Agent, or Firm* — Muncy, Geissler, Olds & Lowe, P.C.

(57) ABSTRACT

An electronic display system and a screen brightness adjusting method thereof are disclosed. The electronic display system includes an electronic display device and a signal connection cable. The electronic display device is electrically connected to a computer system via the signal connection cable, and the signal connection cable can be selectively connected to a mains power supply. The electronic display device comprises a connection port, a control chip, a screen, and a screen brightness adjustment module. After connecting the signal connection cable, the control chip determines whether the signal connection cable is connected to the power supply end to cause the screen brightness adjustment module controls an adjustable maximum brightness of the screen to be equal to a maximum default brightness or lower than the maximum default brightness.

7 Claims, 3 Drawing Sheets

ELECTRONIC DISPLAY SYSTEM AND SCREEN BRIGHTNESS ADJUSTING METHOD THEREOF

BACKGROUND

Technology Field

The present disclosure relates to an electronic display system and a screen brightness adjusting method thereof, particularly to an electronic display system and a screen brightness adjusting method thereof capable of adjusting the usage state according to a power signal.

DESCRIPTION OF THE RELATED ART

Currently, the electronic display device on the market can be electrically connected to a computer system to transmit control signals and image signals. For example, an electronic display device is connected to a USB port and a high-resolution multimedia interface (HDMI) port, respectively, and receives power from an external power. The electronic display device may be directly connected to an adapter to receive the external power. However, this way may be required to prepare many cables. Otherwise, the electronic display device may not work. In addition, in the prior art, an electronic display device may receive power while it is electrically connected to a USB port of a computer system. However, due to the characteristic of the USB port, the electronic display device cannot receive a power signal with sufficient wattage and cannot be turned on normally.

Accordingly, it is necessary to devise a new electronic display system and a screen brightness adjusting method thereof to solve the problem in the prior art.

SUMMARY

It is a major objective of the present disclosure to provide an electronic display system with the effect of being able to adjust the usage state according to a power signal.

It is another objective of the present disclosure to provide a screen brightness adjusting method used for the above system.

To achieve the above objectives, the electronic display system of the present disclosure is electrically connected to a computer system. The electronic display system includes a signal connection cable and an electronic display device. The signal connection cable is connected to the computer system and can be selectively connected to a mains power supply. The electronic display device includes a port, a control chip, a screen, and a screen brightness adjusting device. The port is connected to the signal connection cable. The control chip is connected to the port. The screen brightness adjusting device is electrically connected to the control chip and the screen, and the screen brightness adjusting device is used to adjust a brightness of the screen. Specifically, when the control chip determines that the signal connection cable is connected to the mains power supply, the screen brightness adjusting device controls an adjustable maximum brightness of the screen to be equal to the maximum default brightness. When the control chip determines that the signal connection cable is not connected to the mains power supply, the screen brightness adjusting device controls the adjustable maximum brightness of the screen to be lower than the maximum default brightness.

A screen brightness adjusting method in the present disclosure is used for a screen of an electronic display device, a signal connection cable of the electronic display device is electrically connected to a computer system, and can be selectively connected to a mains power supply, the method includes the following step: controlling the adjustable maximum brightness of the control screen to be lower than the maximum default brightness in response to the signal connection cable is not connected to the mains power supply.

DETAILED DESCRIPTION OF THE PREFERRED EMBODIMENT

Hereafter, the technical content of the present invention will be better understood with reference to preferred embodiments.

Figure 1:
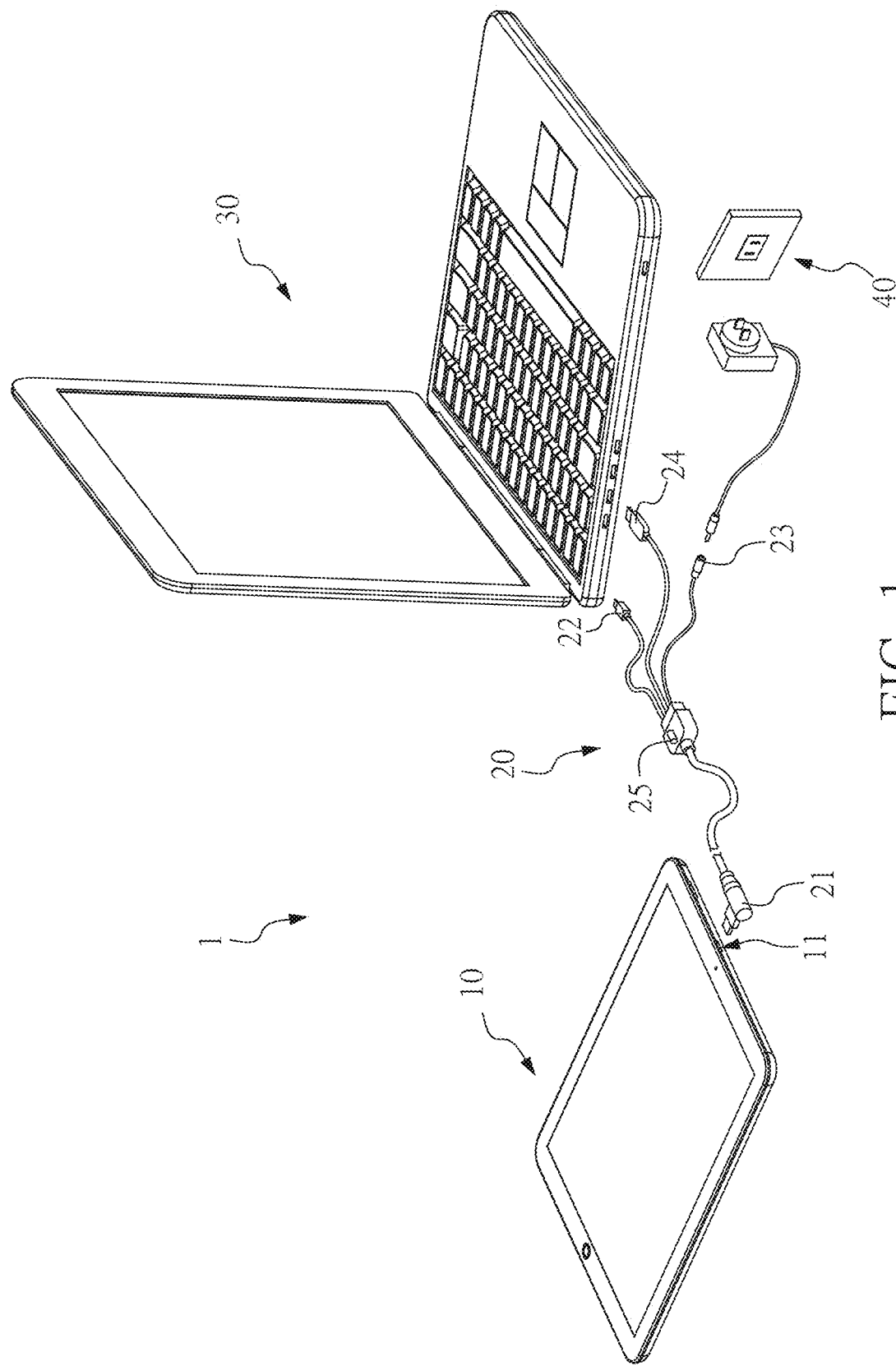
FIG. 1 is an external schematic view showing the connection of an electronic display device and a signal connection cable in the present invention.

Hereafter, please first refer to FIG. 1 for an external schematic view showing the connection of an electronic display device and a signal connection cable in the present invention. It should be noted that although the following description uses the terms "first", "second", etc. to describe various elements, these elements should not be limited by the terms such as the. These terms are only used to distinguish one element from another element. For example, without departing from the scope of the various described embodiments, the first connector may be referred to as the second connector, and similarly, the second connector may be referred to as the first connector. Both the first connector and the second connector are connectors, but they are not the same connector.

In an embodiment of the present invention, an electronic display system 1 includes an electronic display device 10 and a signal connection cable 20. The electronic display device 10 is electrically connected to a computer system 30 via a signal connection cable 20. As shown in FIG. 1, the signal connection cable 20 includes a first connector 21, a second connector 22, a third connector 23, and a fourth connector 24. The first connector 21 is connected to a port 11 of the electronic display device 10. The first connector 21 may be a Type-C connector. The second connector 22 is connected to the computer system 30 for transmitting a control signal. The second connector 22 may be a USB connector. The signal connection cable 20 can be selectively connected to a mains power supply 40 via the third connector 23 to supply a power signal to the electronic display device 10. However, the power signal of electronic display device 10 can also be provided by the computer system 30 via the second connector 22, or by an internally installed battery, but the present invention is not limited thereto. Finally, the fourth connector 24 is also connected to the computer system 30 for transmitting image signals, and the fourth connector 24 can be an HDMI connector. The above signal connection cable 20 is only an illustration of one embodiment of the present invention, and the present invention does not limit the number and specifications of the connectors of signal connection cable 20 to be completely consistent with FIG. 1.

Figure 2:
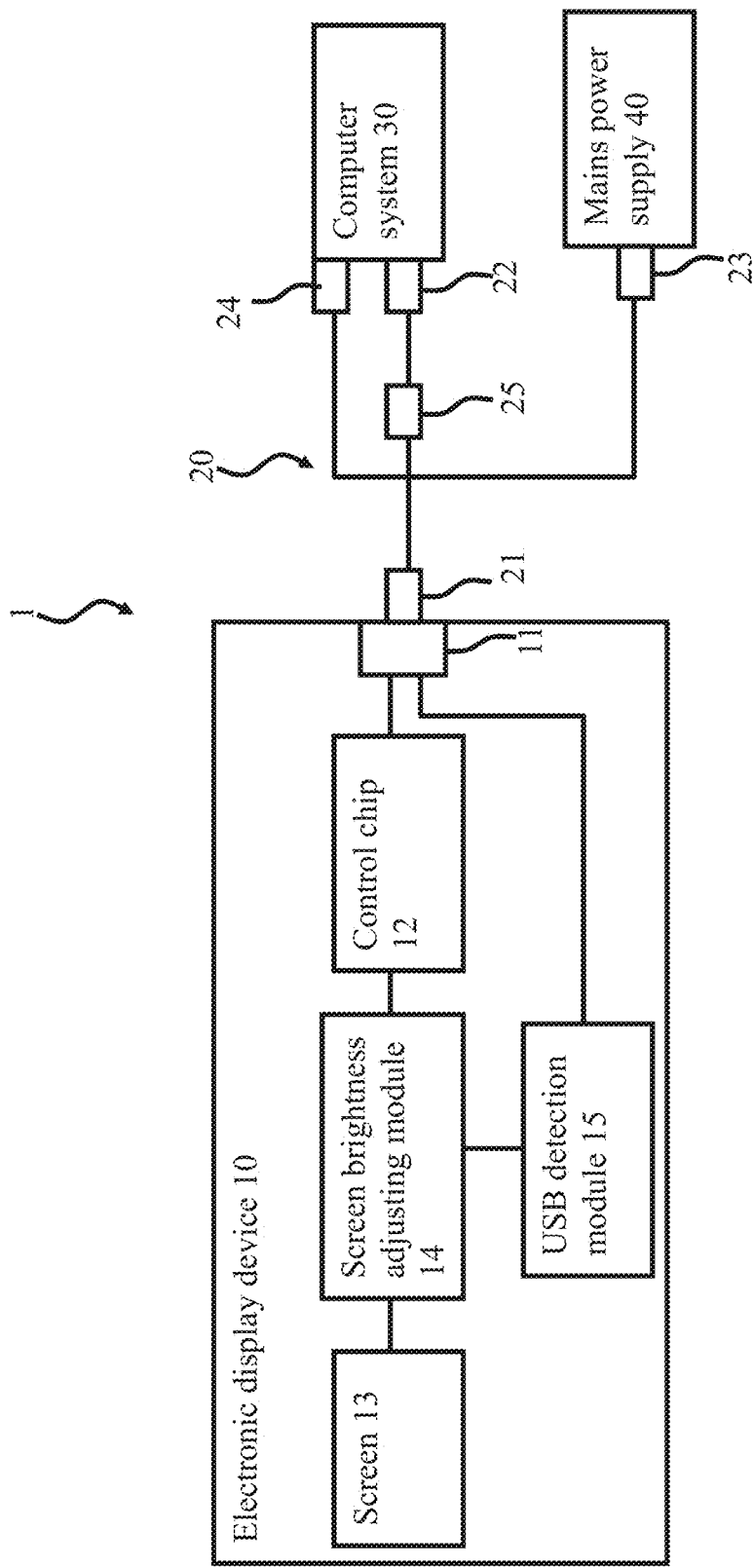
FIG. 2 is an architecture diagram of an electronic display device in the present invention.

Then, please refer to FIG. 2 for an architecture diagram of an electronic display device in the present invention.

The electronic display device 10 in the present invention includes a port 11, a control chip 12, a screen 13, a screen brightness adjusting device 14, and a USB detection module 15. The port 11 is connected to the signal connection cable 20. When the port 11 is connected to the signal connection cable 20, the control chip 12 determines whether the signal connection cable 20 is connected to the mains power supply 40 to determine whether to allow the electronic display device 10 to execute a first mode or a second mode. When the signal connection cable 20 is connected to the mains power supply 40, it means that the electronic display device 10 can receive a power signal with sufficient wattage. At this time, the control chip 12 enables the electronic display device 10 to execute the first mode, that is, it does not limit the performance of the electronic display device 10. When the signal connection cable 20 is not connected to the mains power supply 40, it means that the power signal of the electronic display device 10 can only be provided from a USB port of the computer system 30, and the electronic display device 10 cannot receive a power signal with sufficient wattage. Therefore, the control chip 12 enables the electronic display device 10 to execute the second mode, which is to limit partial performance of the electronic display device 10 and reduce the power consumption of the electronic display device 10. If the signal connection cable 20 is connected to the mains power supply 40 via the third connector 23 while connected to a USB port of the computer system 30 via the second connector 22, because the mains power supply 40 is connected, the electronic display device 10 can receive a power signal with sufficient wattage. Therefore, the electronic display device 10 can execute the first mode.

In general, the voltage value of the power signal converted from the mains power supply 40 and the power signal provided by the USB port of the computer system 30 are the same, i.e. 5V. Therefore, in order for the control chip 12 to identify whether the signal connection cable 20 is connected to the mains power supply 40, the signal connection cable 20 is additionally provided with a diode 25. The diode 25 is connected to the second connector and provided on a transmission path between the second connector 22 and the first connector 21. When the signal connection cable 20 is connected to the mains power supply 40, the voltage transmitted by the signal connection cable 20 is a first voltage, which can be 5V. However, when the signal connection cable 20 is not connected to the mains power supply 40, the power signal transmitted by the second connector 22 will generate a voltage drop through the diode 25, reducing the voltage value from the first voltage to a second voltage, for example, 4.8V. Accordingly, the control chip 12 causes the electronic display device 10 to execute the first mode or the second mode by determining that the voltage transmitted from the signal connection cable 20 is the first voltage of 5V or the second voltage of 4.8V.

The screen 13 is used to display the video signals transmitted from the computer system 30. The screen brightness adjusting device 14 is electrically connected to the control chip 12 and the screen 13 for adjusting a brightness of the screen 13. In an embodiment of the present invention, the power consumption of the electronic display device 10 can be reduced by reducing the brightness of the screen 13. Accordingly, when the electronic display device 10 is in the first mode, the performance of the electronic display device 10 will not be limited. Therefore, the screen brightness adjusting device 14 will control an adjustable maximum brightness of the screen 13 to be equal to a maximum default brightness of the screen 13. However, when the electronic display device 10 is in the second mode, partial performance of the electronic display device 10 will be limited, such that the screen brightness adjusting device 14 controls the adjustable maximum brightness of the screen 13 to be lower than the maximum default brightness of screen 13. In this way, the power consumption of the screen 13 can be reduced.

When the electronic display device 10 executes the second mode, the screen brightness adjusting device 14 further controls the adjustable maximum brightness of the electronic display device 10 to be a first brightness or a second brightness according to the port type of the computer system 30 connected to the signal connection cable 20, where the second brightness is greater than the first brightness. For example, the first brightness is 30% of the maximum default brightness of the screen 13, and the second brightness is 60% of the maximum default brightness of the screen 13, but the present invention is not limited to the value. Therefore, the electronic display device 10 has a USB detection module 15, which can detect whether the signal connection cable 20 connected to the computer system 30 via a USB 2.0 port or a USB 3.0 port. When the USB detection module 15 detects that the signal connection cable 20 connected to the computer system 30 is via a USB 2.0 port, limited by the power supply capability of the USB 2.0 port (5V/0.5 A), the screen brightness adjusting device 14 controls the adjustable maximum brightness of the screen 13 to be the first brightness, which is darker than the maximum default brightness of the screen 13. When the USB detection module 15 detects that the signal connection cable 20 connected to the computer system 30 is via a USB 3.0 port, with the better power supply capability of the USB 3.0 port (5V/0.9 A), the screen brightness adjusting device 14 controls the adjustable maximum brightness of the screen 13 to be the second brightness, which is brighter than the first brightness.

Moreover, when the USB detection module 15 detects that the signal connection cable 20 connected to the computer system 30 is via the USB 2.0 port, and the brightness of the screen 13 is greater than the first brightness, for example, when the brightness of screen 13 is fully bright at this time, the screen brightness adjusting device 14 will adjust the brightness of the screen 13 to the first brightness, namely, to force down the brightness of the screen 13 to 30% of the maximum default brightness. When the USB detection module 15 detects that the signal connection cable 20 connected to the computer 3.0 is the USB 3.0 port, and the brightness of the screen 13 is greater than the second brightness, the screen brightness adjusting device 14 adjusts the brightness of the screen 13 to be the second brightness, namely, to force down the brightness of the screen 13 to 60% of the maximum default brightness. In an embodiment of the present invention, the screen brightness adjusting device 14 is a driver integrated circuit.

It should be noted that each module of the electronic display device 10 can be constructed by various manners such as hardware devices, software programs with hardware devices, and firmware combined with hardware devices, but the present invention is not limited to the manner described above. Additionally, the preferred embodiments of the present invention described above are only illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs, and other modules or elements may not necessarily exist between two of any modules.

Figure 3:
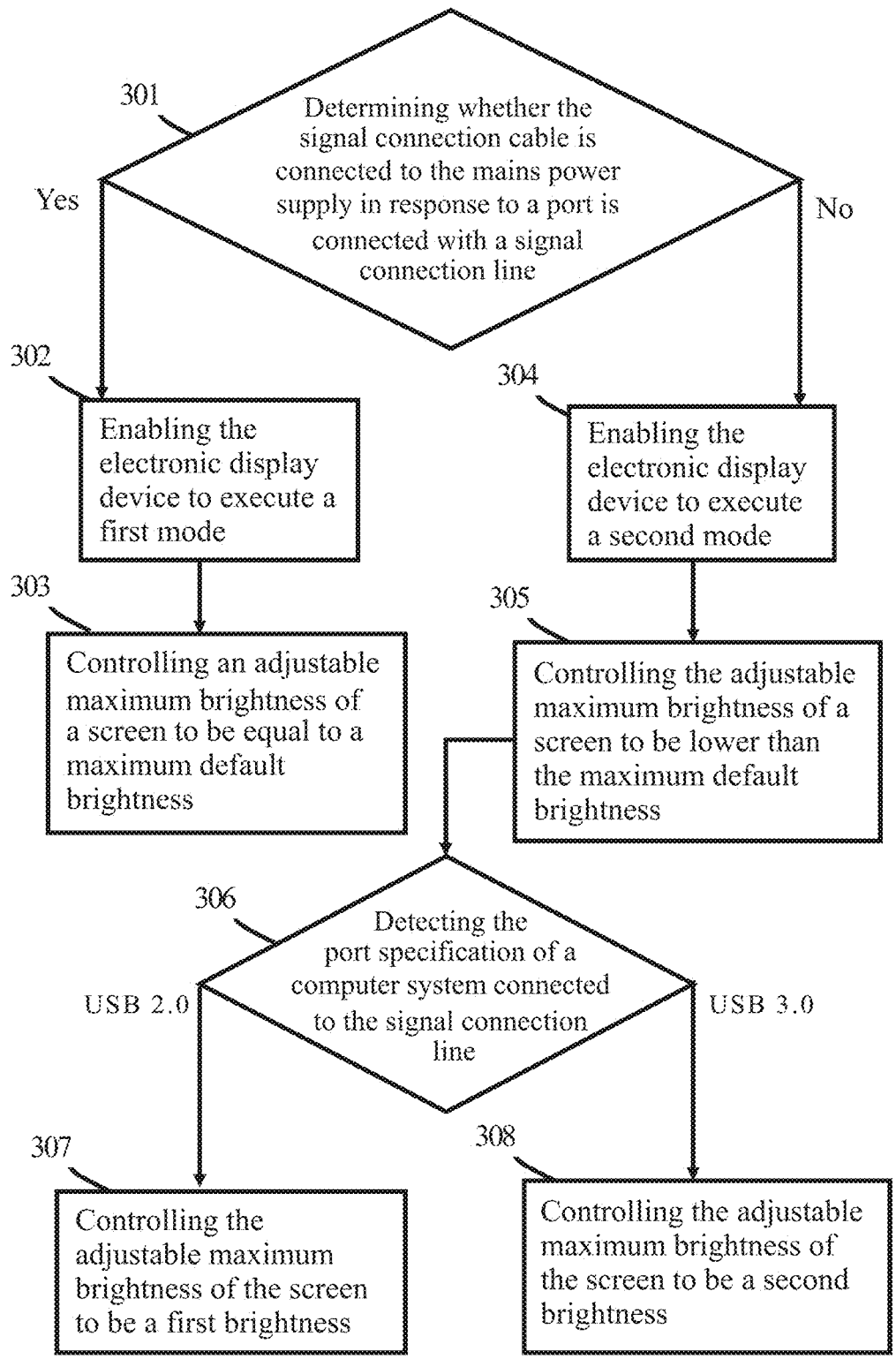
FIG. 3 is a flowchart showing steps of a screen brightness adjusting method in the present invention.

Then, please refer to FIG. 3 for a flowchart showing steps of a screen brightness adjusting method in the present invention. It should be noted here that although the above-mentioned electronic display device 10 is used as an example to describe the screen brightness adjusting method of the present invention, the screen brightness adjusting method of the present invention is not limited to the electronic display device 10 used in the same structure described above.

First, in Step 301: Determining whether the signal connection cable is connected to the mains power supply in response to a port is connected with a signal connection cable.

Firstly, a voltage transmitted from the signal connection cable 20 can be set as a first voltage in response to the signal connection cable 20 is connected to the mains power supply 40. Then if the signal connection cable 20 is not connected to the mains power supply 40, the voltage transmitted from the signal connection cable 20 can be set as a second voltage. Thus, when the port 11 is connected to the signal connection cable 20, the control chip 12 determines the voltage transmitted from the signal connection cable 20, e.g. the voltage transmitted from the signal connection cable 20 is the first voltage of 5V or the second voltage of 4.8V, to confirm whether the signal connection cable 20 is connected to the mains power supply 40.

In response to the signal connection cable 20 is connected to the mains power supply 40, perform Step 302: Enabling the electronic display device to execute a first mode.

The control chip 12 causes the electronic display device 10 to execute a first mode in response to the signal connection cable 20 is connected to the mains power supply 40, and namely it does not limit the performance of the electronic display device 10.

Accordingly, in Step 303: Controlling an adjustable maximum brightness of a screen to be equal to a maximum default brightness.

When the electronic display device 10 is in the first mode, as the performance of the electronic display device 10 will not be limited, the screen brightness adjusting device 14 will control an adjustable maximum brightness of the screen 13 to be equal to a maximum default brightness of the screen 13. Accordingly, the user can adjust the brightness of the screen 13 to the maximum default brightness.

Additionally, in response to the signal connection cable 20 is not connected to the mains power supply 40, perform Step 304: Enabling the electronic display device to execute a second mode.

When the signal connection cable 20 is not connected to the mains power supply 40, it means that the electronic display device 10 cannot receive a power signal with sufficient wattage. Therefore, the control chip 12 enables the electronic display device 10 to execute a second mode in response to the signal connection cable 20 is not connected to the mains power supply 40, which limits partial performance of the electronic display device 10 and reduces the power consumption of the electronic display device 10.

Further, in Step 305: Controlling the adjustable maximum brightness of a screen to be lower than the maximum default brightness.

When the electronic display device 10 is in the second mode, partial performance of the electronic display device 10 will be limited to reduce power consumption. Therefore, the screen brightness adjusting device 14 controls the adjustable maximum brightness of the screen 13 to be lower than the maximum default brightness.

At this time, proceed to Step 306: Detecting the port specification of a computer system connected to the signal connection cable.

At this time, the USB detection module 15 can further detect the signal connection cable 20 connected to the computer system 3.0 is via a USB 2.0 port or a USB 3.0 port to get the wattage of the power signal the electronic display device 10 can receive.

In response to the signal connection cable 20 connected to the computer system 30 is via a USB 2.0 port, perform Step 307: Controlling the adjustable maximum brightness of the screen to be a first brightness.

Due to the power supply capability of the USB 2.0 port, the screen brightness adjusting device 14 controls the adjustable maximum brightness of the screen 13 to be the first brightness, e.g. 30% of the maximum default brightness of the screen 13. At this time, the user can adjust the brightness of the screen 13 to not exceed 30% of the maximum default brightness. If the original brightness of the screen 13 has exceeded the first brightness, the screen brightness adjusting device 14 will also control the brightness of the screen 13 to decrease to the first brightness.

Finally, in response to the signal connection cable 20 connected to the computer system 30 is a USB 3.0 port, perform Step 308: Controlling the adjustable maximum brightness of the screen to be a second brightness.

Due to the better power supply capability of the USB 3.0 port, the screen brightness adjusting device 14 controls the adjustable maximum brightness of the screen 13 to be the second brightness, such as 60% of the maximum default brightness of the screen 13. At this time, the user can adjust the brightness of the screen 13 to not exceed 60% of the maximum default brightness. If the original brightness of the screen 13 has exceeded the second brightness, the screen brightness adjusting device 14 will also control the brightness of the screen 13 to decrease to the second brightness.

It should be noted here that the screen brightness adjusting method of the present invention is not limited to the order of the above steps. As long as the purpose of the present invention can be achieved, the order of the above steps can also be changed.

In this way, the electronic display device 10 of the present invention can adjust the performance according to the received power signal to achieve the best utilization effect.

It should be noted that the preferred embodiments of the present invention described above are merely illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules. All without departing from the scope of the invention are defined solely by the appended claims.

What is claimed is:

1. An electronic display system, electrically connected to a computer system, the electronic display system comprising:
    an electronic display device, comprising:
        a port;
        a control chip, connected to the port;

a screen; and a screen brightness adjusting device, electrically connected to the control chip and the screen, the screen brightness adjusting device being used for adjusting a brightness of the screen; and a signal connection cable, comprising:

a first connector, connected to the electronic display device;

a second connector, connected to the computer system;

a third connector, selectively connected to a mains power supply to allow the electronic display device to receive a power from the mains power supply directly; and a diode, connected to the second connector; wherein when the third connector of the signal connection cable is connected to the mains power supply, the voltage transmitted by the first connector of the signal connection cable via the third connector is a first voltage; when the third connector of the signal connection cable is not connected to the mains power supply, the voltage transmitted by the first connector of the signal connection cable via the diode and the second connector is a second voltage, wherein the second voltage is less than the first voltage;

wherein when the control chip determines that the signal connection cable is connected to the mains power supply according to the first voltage, the screen brightness adjusting device controls an adjustable maximum brightness of the screen to be equal to a maximum default brightness of the screen; when the control chip determines that the signal connection cable is not connected to the mains power supply according to the second voltage, the screen brightness adjusting device controls the adjustable maximum brightness of the screen to be lower than the maximum default brightness of the screen.

2. The electronic display system as claimed in claim 1, wherein when the third connector of the signal connection cable is not connected to the mains power supply and the second connector is connected to the computer system, the screen brightness adjusting device varies the adjustable maximum brightness of the electronic display device depending on a port of the computer system to which the second connector of the signal connection cable is being connected.

3. The electronic display system as claimed in claim 1, wherein the electronic display system further comprises a USB detection module, the third connector of the signal connection cable is not connected to the mains power supply and the second connector of the signal connection cable is connected to a USB port of the computer system, wherein:

when the USB detection module detects that the USB port of the computer system to which the second connector of the signal connection cable is being connected is a USB 2.0 port, the screen brightness adjusting device controls the adjustable maximum brightness of the screen to be a first brightness; and when the USB detection module detects that the USB port of the computer system to which the second connector of the signal connection cable is being connected the computer system is a USB 3.0 port, the screen brightness adjusting device controls the adjustable maximum brightness of the screen to be a second brightness.

4. The electronic display system as claimed in claim 3, wherein the first brightness is 30% of the maximum default brightness of the screen, and the second brightness is 60% of the maximum default brightness of the screen.

5. A screen brightness adjusting method, used for an electronic display device, the electronic display device including a port, a control chip, a screen and a screen brightness adjusting device, the control chip being connected to the port, the screen brightness adjusting device being electrically connected to the control chip and the screen, the screen brightness adjusting device being used to adjust a brightness of the screen, a signal connection cable of the electronic display device comprising a first connector, a second connector, a third connector, and a diode; wherein the first connector is connected to the port of the electronic display device, the second connector is connected to a computer system, the third connector is selectively connected to a mains power supply, and the diode is connected to the second connector; wherein when the third connector of the signal connection cable is connected to the mains power supply, the voltage transmitted by the first connector of the signal connection cable via the third connector is a first voltage; when the third connector of the signal connection cable is not connected to the mains power supply, the voltage transmitted by the first connector of the signal connection cable via the diode and the second connector is a second voltage, wherein the second voltage is less than the first voltage; the method comprising the following step:

controlling an adjustable maximum brightness of the screen to be lower than a maximum default brightness in response to the voltage transmitted from the signal connection cable is the second voltage; and controlling the adjustable maximum brightness of the screen to be equal to the maximum default brightness in response to the voltage transmitted from the signal connection cable is the first voltage to allow the electronic display device to receive a power from the mains power supply directly.

6. The screen brightness adjusting method as claimed in claim 5, further comprising:

controlling the adjustable maximum brightness of the screen to be a first brightness in response to the voltage transmitted from the signal connection cable is the second voltage and the signal connection cable connected to a USB 2.0 port of the computer system is detected; and controlling the adjustable maximum brightness of the screen to be a second brightness in response to the voltage transmitted from the signal connection cable is the second voltage and the signal connection cable connected to a USB 3.0 port of the computer system is detected.

7. The screen brightness adjusting method as claimed in claim 6, wherein the first brightness is 30% of the maximum default brightness of the screen, and the second brightness is 60% of the maximum default brightness of the screen.

* * * * *